Nov. 12, 1968

C. G. HART 3,410,062

FILTER

Filed Sept. 12, 1966

INVENTOR.
CHARLES G. HART.

BY

ATTORNEY

Nov. 12, 1968  C. G. HART  3,410,062
FILTER

Filed Sept. 12, 1966  6 Sheets-Sheet 3

INVENTOR.
CHARLES G. HART.
BY
*F. P. Keeper*
ATTORNEY

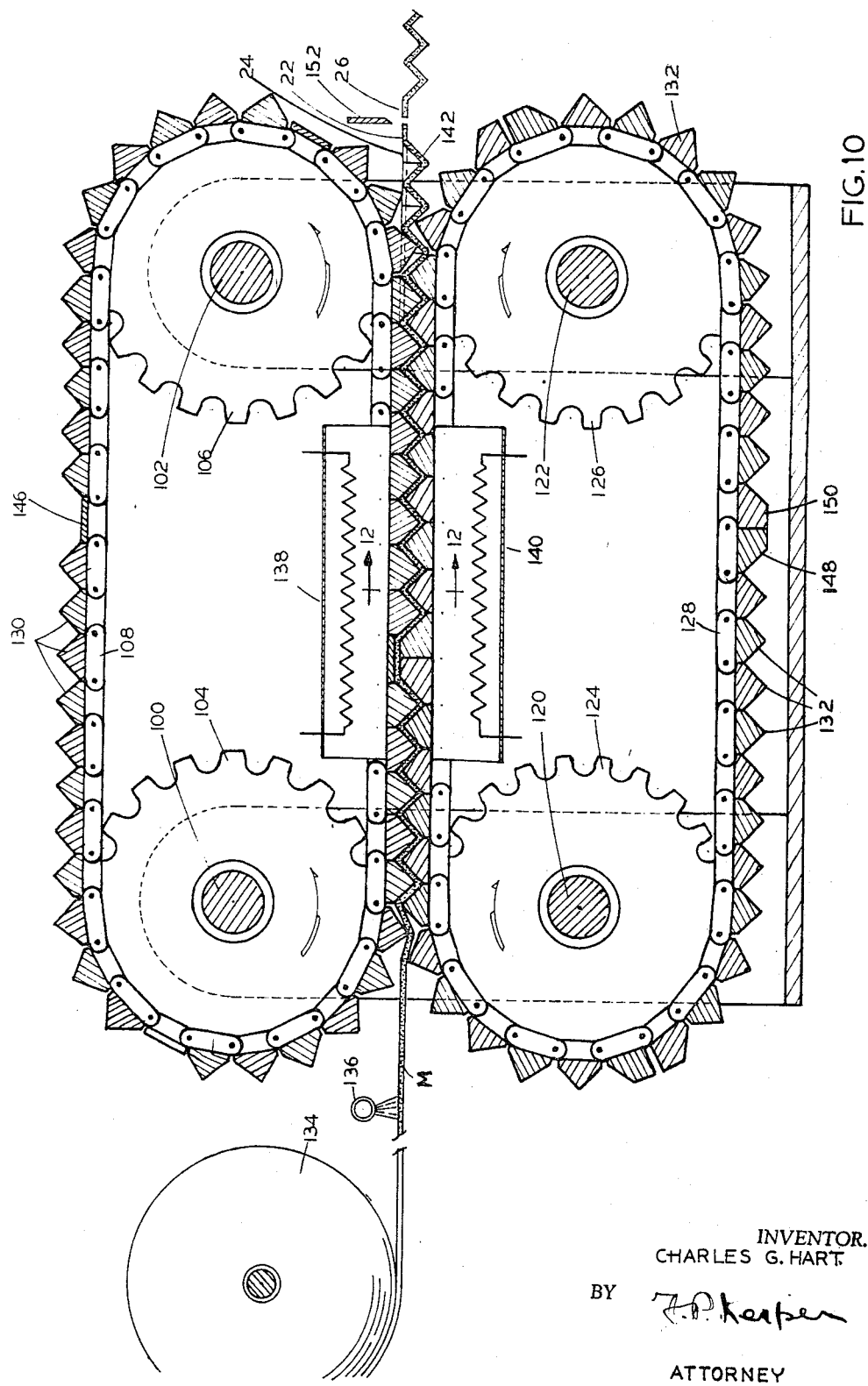

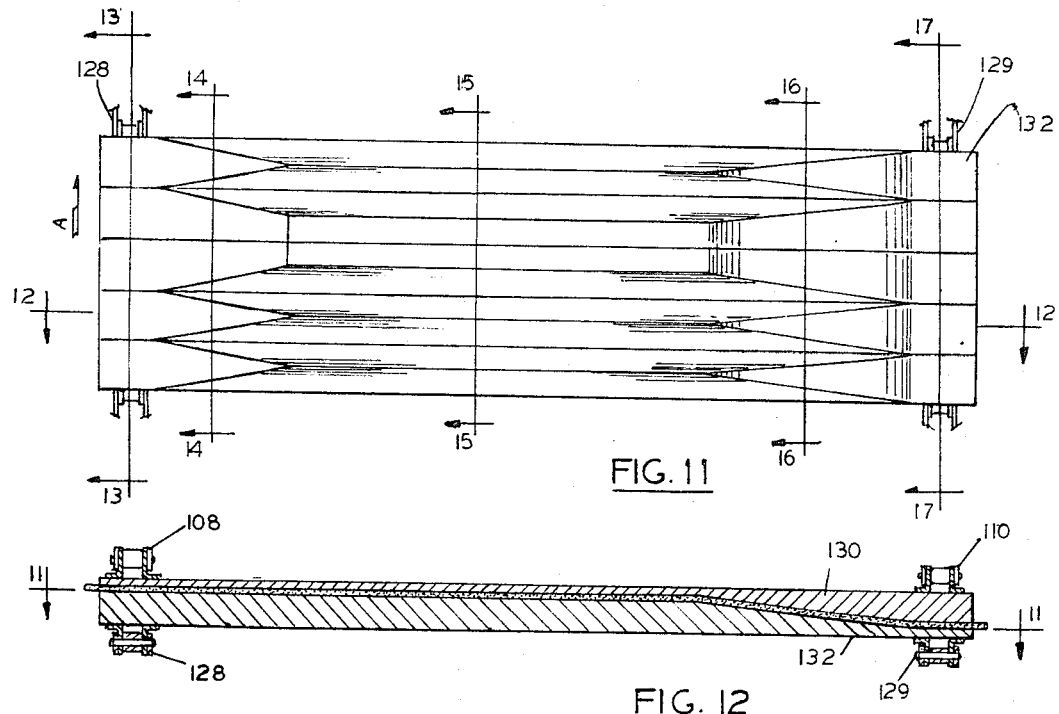

INVENTOR.
CHARLES G. HART.
BY
ATTORNEY

United States Patent Office 3,410,062
Patented Nov. 12, 1968

3,410,062
FILTER
Charles G. Hart, Syracuse, N.Y., assignor to Cambridge Filter Corporation, Syracuse, N.Y., a corporation of New York
Filed Sept. 12, 1966, Ser. No. 584,034
7 Claims. (Cl. 55—497)

ABSTRACT OF THE DISCLOSURE

Air filter having a core construction composed of a plurality of like preformed self-sustaining panels of filter media arranged in a stack, with every other panel reversed, each panel having planar inlet and outlet marginal portions and a uniform series of V-sectioned corrugated portions extending from one marginal portion to the other, the V-corrugated portions having alternate apices lying in one of two spaced common planes, one of said planes being common to the inlet marginal portion, and the other being common to the outlet marginal portion, and said panels also having planar edge marginal portions lying in one of said planes, and apparatus for heat curing and forming the panels from media coated on one side with a heat curable binder, which becomes the downstream side.

---

This invention relates to air filters of the pleated extended area type wherein the use of spacing separators is avoided.

It has been the practice to provide disposable filters of the high efficiency type, wherein the filter media is arranged in a multiplicity of closely spaced pleats, and wherein the pleat spacing is maintained by corrugated spacers. Filter cores constructed in this manner are enclosed within surrounding rectangular frames to which the core is sealed, and the depth of the core may vary as desired, depending on how much filter area is desired per unit. The filter media in such cores comprises a series of flat flanks between successive pleat folds, that are held apart by the corrugated spacers, and the sum total area of such flat flanks constitute the filter area. Since such filter units or cartridges are disposable when the accumulation of airborne impurities builds up sufficiently to materially increase the resistance to flow through the filter media, it is desirable to construct the units or cartridges as economically as possible and especially to avoid the use of material which does not perform a filter function.

The present invention is directed to a filter core wherein the filter media is rigidly formed into corrugations extending transversely of the pleat folds, so as to avoid the necessity for and eliminate corrugated spacers. The invention has to do with the formation of a plurality of filter media, which are similar to the flanks of a pleated filter as referred to, but in which each panel is provided with an increase in area of filter media by providing the panel with a multiplicity of V corrugations extending generally depthwise, and which corrugations by being formed into a rigid panel structure, serve to maintain the spacing without spacers. Thus by corrugating the media itself the filter media surface area is increased, and the spacers rendered unnecessary. The invention further has to do with streamlining of the panel elements, in the formation of the corrugations whereby turbulence of the air entering the filter, and leaving the filter is reduced to a minimum so that resistance to flow through the filter approaches that of the resistance to flow through the equivalent area of the media.

The invention further has to do with the economical formation of the panel elements, so that each panel is formed in a precision manner and given a rigid corrugated shape capable of self-sustainment, when a stack of such panels are formed into a core and encased in a surrounding frame.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 10 is a lengthwise sectional view through an apparatus for forming the panels;

FIGURE 11 is a plan view of a typical series of forming bars employed on the lower half of the apparatus of FIGURE 10;

FIGURE 12 is a transverse sectional view taken through a pair of forming bars, substantially on the line 12—12 of FIGURE 10 and as to the lower bar, the line 12—12 of FIGURE 10;

Figure 2:
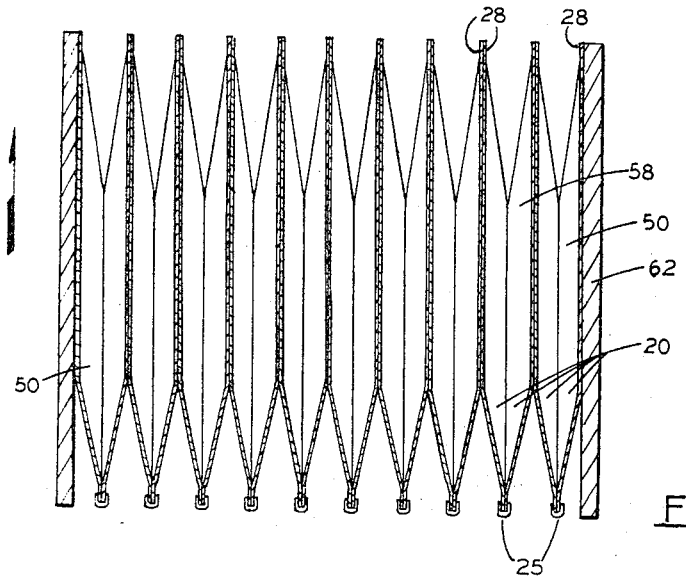
FIGURE 2 is a sectional view taken on the line 2—2 of FIGURE 1.
Figure 1:
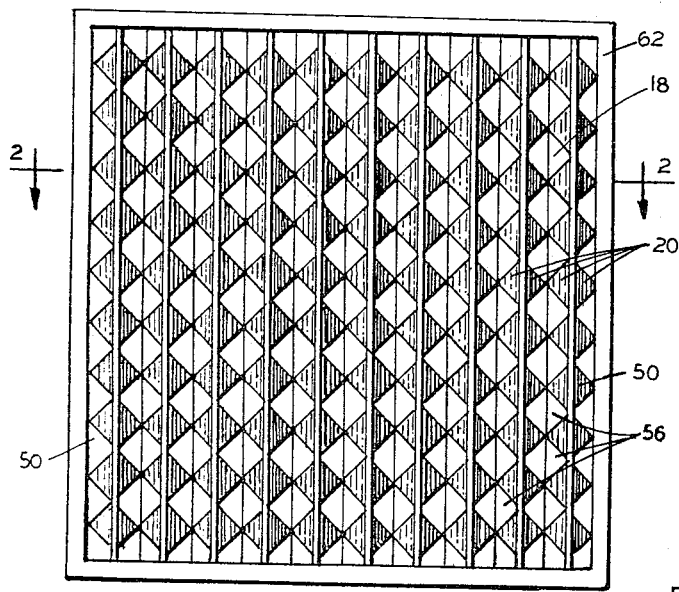
FIGURE 1 is an elevational view of the entrance or upstream side of a filter unit.
Figure 3:
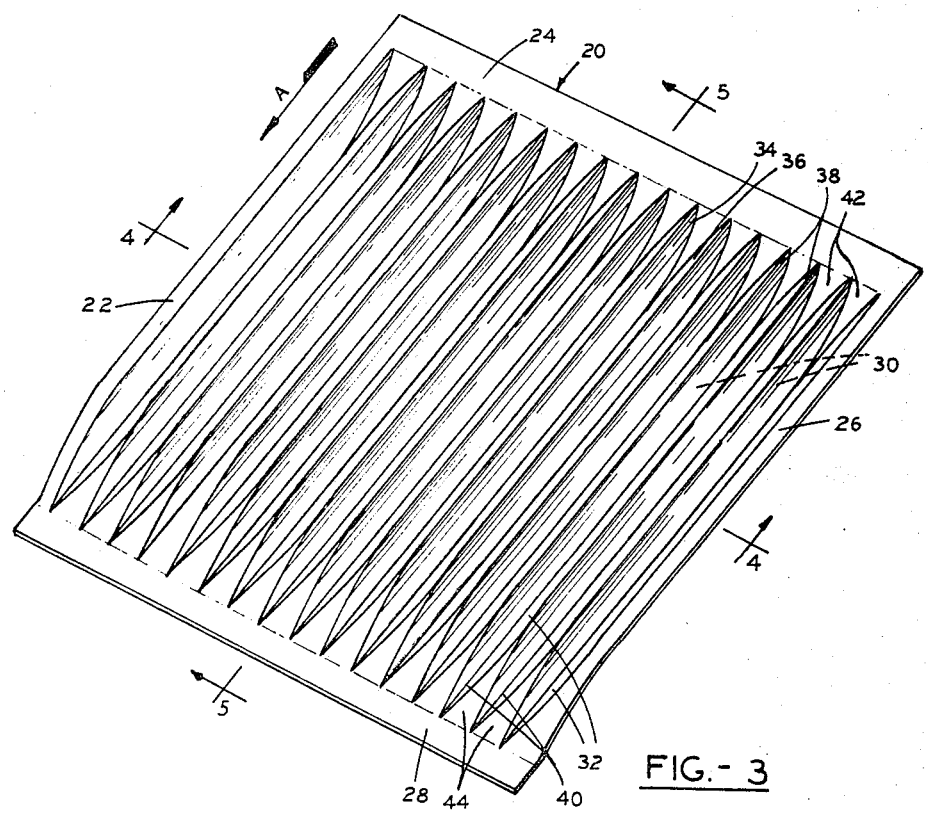
FIGURE 3 is a perspective view of one panel employed in stacks to construct the core of the filter unit of FIGURE 1.
Figure 4:
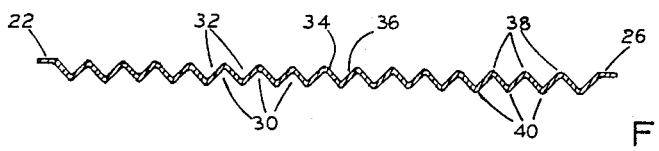
FIGURE 4 is a sectional view taken on the line 4—4 of FIGURE 3.
Figure 5:
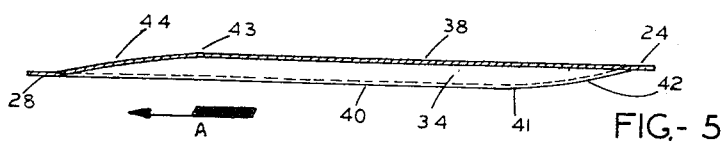
FIGURE 5 is a sectional view taken on the line 5—5 of FIGURE 3.
Figure 6:
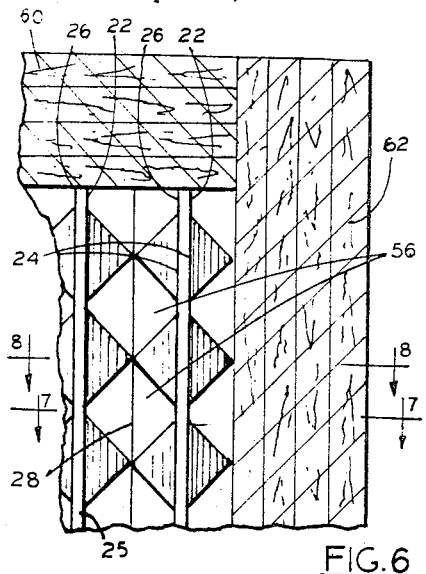
FIGURE 6 is an enlarged fragmentary view of the upper right hand corner of FIGURE 1.

Referring to the drawings, in FIGURE 1 there is shown a filter frame 62 having a core 18 formed from a stack of filter panels 20, of the general configuration of the single panel as shown in FIGURE 3. All panels of the core are alike, but alternate panels are reversed or arranged back to back. Each element or panel 20 is formed from fiber glass filter material in mat form, for example as supplied from a roll of the mat material, such roll being of a suitable width, corresponding to the depth of the filter core to be fabricated. The filter media may include curing resins in powdered or liquid form, or comprise raw fiber glass material in mat form to which a plastic binder may be supplied as by spraying from one side before the mat is formed into the panels, suitable apparatus for the purpose being indicated in FIGURES 10–17, such apparatus to be referred to more in detail hereinafter. Each panel as formed, has stiffness imparted to it so as to be rigid and capable of maintaining its shape, as indicated in FIGURE 3.

Each element or panel as formed comprises a marginal edge portion along three sides, 22, 24 and 26, that lies for the most part, in a common plane, and an edge portion 28 on the fourth side which lies in a plane offset from the plane of the edge portions 22, 24, and 26. Each element includes a series of corrugations providing alternating oppositely facing grooves 30 and 32 of V formation, the grooves 30 being on the upstream side of the panel and the underside of FIGURE 3, while the grooves 32 appear on the downstream side, and top side of FIGURE 3. The adjacent flanks 34 and 36 common to both grooves bear an angle to one another of about 90 degrees. The apices 38 of the grooves 30 for a major portion of their length all lie in the plane of the edge 24. The grooves 32 are open at one end and terminate adjacent the other with a gradually inclined elongate triangular area 42, which merges with the edge portion 24 while the apices 40 of such grooves lie for a major portion of their length in the plane of the edge 28. Similarly the grooves 30 are open at the other end, and terminate adjacent the edge 28 with a gradually inclined elongate triangular area 44 that merges into edge 28.

It will be seen that each apex 38 extends straight for a substantial distance and terminates as it merges as at 43 into the apex of gradually inclined area 44, and that each apex 40 extends straight for a substantial distance and terminates as it merges as at 41 into the apex of a gradually inclined area 42.

A plurality of like panels elements 20 are placed side by side and arranged in vertical planes, with alternate elements reversed or back to back, so that the edge portions 28 and the apices 40 of adjacent elements are in contact and the grooves 30 face each other, while the edges 24, and the planar portions of edges 22 and 26 and apices 38 of adjacent elements are in contact, and the edge 22 of each element is in contact with the edge 26 of the adjacent element either at the top or bottom of the stack. The contacting portions of surfaces 22 and 26, and the contacting surfaces 24 and 28, and apices 38 and 40 are provided with adhesive. When a stack of suitable size builds up, the edges 22 and 26 of the stack may be trimmed so as to all lie in the upper or lower of two parallel planes spaced so as to be received between the upper and lower members of a frame, to which the edges are eventually adhesively and sealingly secured. The number of elements in a stack will be such as to provide a core of the desired width so as to be received in the frame, and the edge portions 28 and the apices 40 of the opposite end elements 50 will be adhesively attached to the frame side walls.

The leading edges 24 of adjacent panels may be adhesively secured along the entire length from top to bottom of the core, and if desired a strip of thin metal, of U section may be crimped over the edges as is indicated at 25. As is shown in FIGURES 6-9, two adjacent panels 50 and 52 have their apices 38 abutting, and adhesively secured, while the adjacent panels 52 and 54 have their apices 40 abutting and adhesively secured along the lines of contact. The upper edges of the panels 22 and 26, see FIGURE 9, which lie in the same plane with the edge portions 24, at the air inlet end of the filter are also adhesively secured together, and their edges adhesively secured to the casing.

Figure 9:
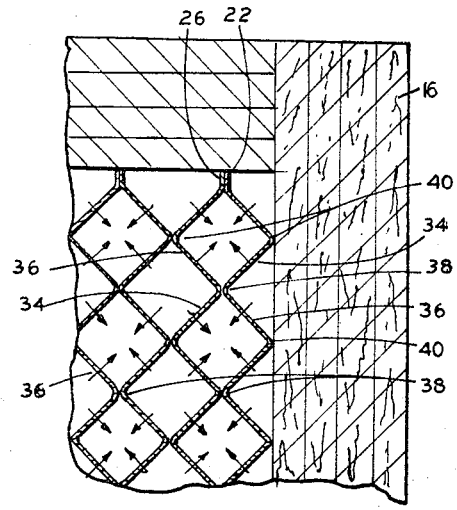
FIGURE 9 is a fragmentary sectional view taken on the line 9—9 of FIGURE 7.
Figure 7:
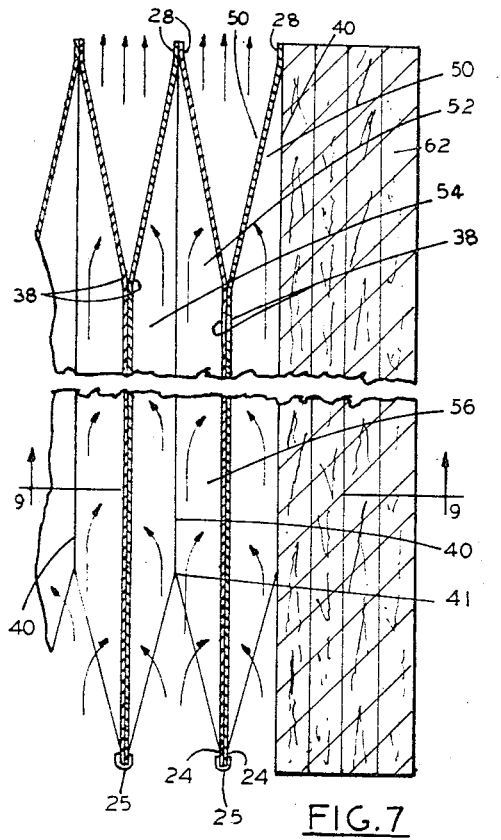
FIGURE 7 is a fragmentary sectional view taken on the line 7—7 of FIGURE 6.
Figure 8:
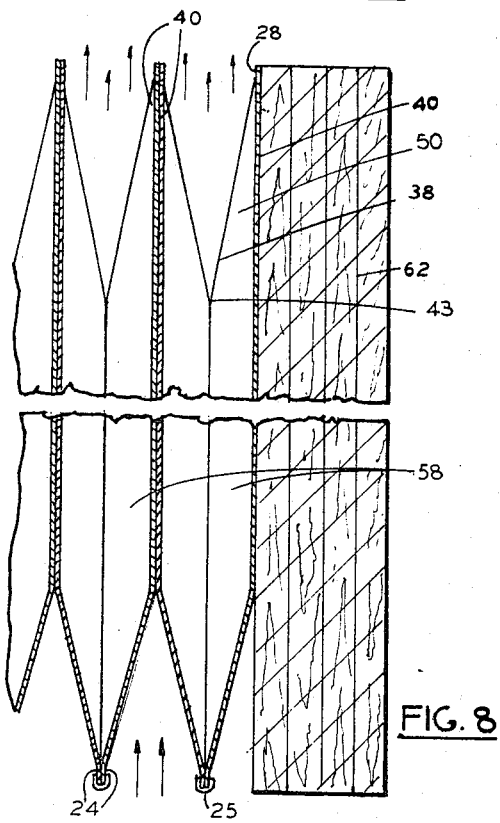
FIGURE 8 is a fragmentary sectional view taken on the line 8—8 of FIGURE 6.
Figure 13:
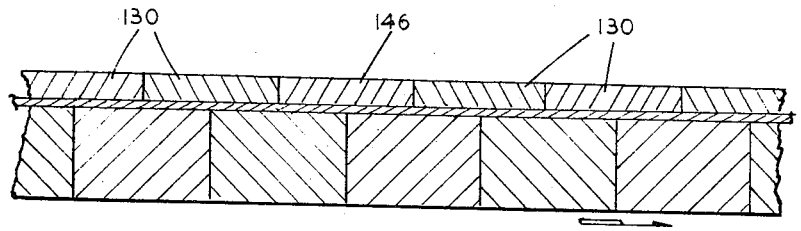
FIGURES 13, 14, 15, 16 and 17 are enlarged sectional views through a typical series of pairs of mating forming bars taken on planes located as at 13—13, 14—14, 15—15, 16—16, and 17—17, with reference to the series of bars shown in FIGURE 11.
Figure 14:
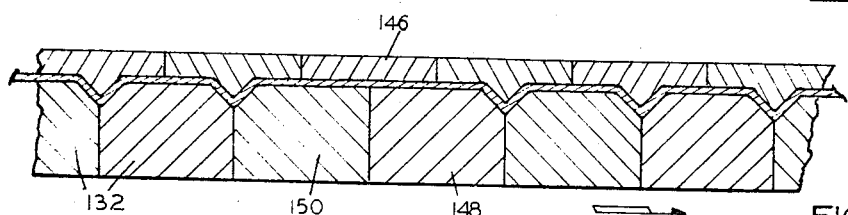
Figure 15:
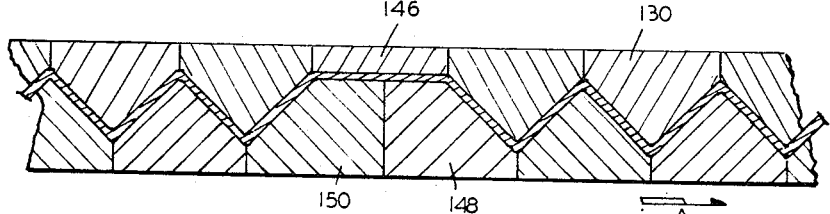
Figure 16:
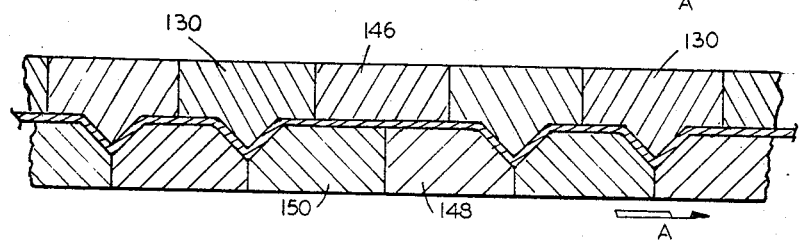
Figure 17:
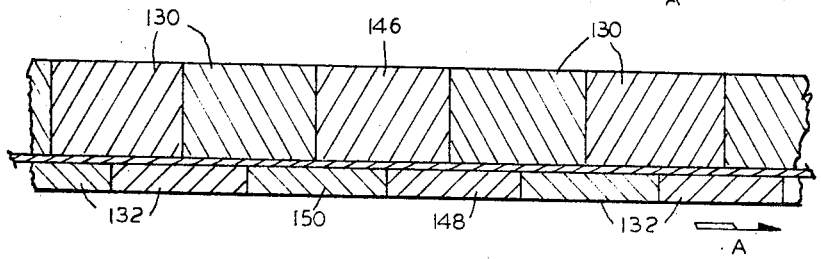

As is indicated in FIGURES 7 and 8, air enters the pockets 56 formed by the adjacent panels, and is filtered as it passes through the filter material as indicated by the arrows in FIGURE 9, the air entering the pockets 58 which lead to the air outlet face of the filters. It can be seen that the cross sectional area of the pockets 56 is approximately a half of the air entrance area embraced by the frame 62. Thus as air enters the filter, see FIGURE 7, its velocity is caused to practically double before it reaches the point 41 where the apices 40 of the panels initially contact. The portion of the filter depth employed, between the outer edges 24 of the panels and the point 41 where the apices first contact may be nicely balanced as against the total depth of the filter core so as to minimize turbulence at the entrance due to the acceleration of air flow at the entrance. By having the confining effect of the pockets commence inwardly of the filter core, as for example at 41, the acceleration in the air flow is gradual and turbulence and back pressure reduced. It will of course be understood that in this region, some air will find its way through the filter medium into the outflow pocket 58, and air flow proceeding into the pocket 56, beyond the point 41, will gradually have its velocity diminish, as air filters through the media into the outgoing pockets 58.

In a similar manner, air emerging from the outlet face of the filter, gradually has its velocity reduced by about half as in the outflow portion of the filter from the point 43 to the outlet face of the filter, as at 28. This decrease in flow rate results in turbulence and such turbulence is minimized by providing the extended length from point 43 to the outlet face to provide a gradual decrease in the rate of flow. In practice, it has been found that the turbulence at the outlet side, due to the reduction in flow rate, affords greater back pressure than at the entrance end, and to reduce the turbulence it is desirable to use a greater portion of the core depth between the point 43 and the outlet face than is employed at the inlet end between the inlet face and the point 41.

In order to fabricate panels of the type illustrated in FIGURE 3, forming plates or other means may be employed. For forming such panels on a continuous basis, apparatus as generally indicated in FIGURES 10-17 may be employed. As there shown two sets of endless chains arranged on spaced sprockets on shafts, are employed to carry a sequence of mating forming bars. In FIGURE 10, upper shafts 100 and 102 each carry a pair of sprockets, one of each pair being shown at 104 and 106. A forming bar carrying chain 108 is also indicated. Two such chains with forming bars are employed as shown at 108 and 110 in FIGURE 12. Referring again to FIGURE 10, the lower shafts 120 and 122 also carry pairs of sprockets, sprockets 124 and 126 being shown with a forming bar supporting chain 128. The pairs of sprockets support two chains as is indicated at 128 and 129 in FIGURE 12.

The forming bars 130 of the chains carried by the upper sprockets 104 and 106 mate with the forming bars 132 of the chains carried by the lower sprockets, except for such clearance as is necessary for the filter media. The rotation of the sprockets as indicated, draws filter media from a roll supply 134. Before entering the forming apparatus the upper surface of the media, which will correspond to the downstream side of the panels formed, will be coated or saturated with a phenolic or other curable binder, as by spray as is indicated at 136 or by a prior saturating operation. Such binder, in combination with any binder in the media in mat form, if any, will be cured, as the media passes through the forming apparatus, the intermeshing reaches of the forming apparatus being provided with heaters, electric or otherwise, as at 138 and 140 to heat the bars so that curing will be effected. The apparatus may be steam jacketed if desired to enhance the curing, or steam alone can be used for the purpose.

The rate of passage of the media through the apparatus, and the temperature of the bars will be such as to effect curing of the mat and binder, so that the media on emerging from the apparatus, as at 142, will be rigidly formed and self sustaining. While the groove forming bars 130 are all alike and the mating bars 132 are all alike, in order to provide the panels with the marginal edges 24 and 26 at suitable intervals, special bars 146 and bars 148, 150 are provided at fixed intervals along the sprocket chains. In the apparatus illustrated eleven grooves 32 are formed by eleven bars 130 between each edge forming bar 146. In order to illustrate the shapes that the forming bars may take, sectional views at various points crosswise of the apparatus are taken as in FIGURES 13, 14, 15, 16 and 17, on section lines as shown in FIGURES 11 or 12. As the panels emerge from the forming apparatus, they may be cut into individual panels, as by a knife, or a flying shear 152 or folded back on one another.

While the panels in FIGURE 3, and the bars 130 and 132 are shaped to provide triangular portions as at 42 and 44, the central 45 degree sides of the bars, could if desired at either end merely twist into the flat end portions. Any gradual transformation from the section shown in FIGURE 15, to that shown in section in FIGURES 13 and 17 may be employed as desired.

The finished panels will preferably have the greater portion of the binder on their downstream surfaces, thus leaving the fiberglass mat of the panels more receptive on the upstream side. In practice the pitch, number and length of the grooves in a panel can be varied to suit, and as many like panels may be arranged back to back in a stack to form a core of desired dimensions, that is self-sustaining, and which merely requires such trimming as necessary for fitting into a frame, and sealing thereto. If desired, such a core may be wrapped around its edges in a layer of uncompacted fiber glass, and a frame applied therearound, as in Baldwin U.S. Patent No. 2,884,091, Apr. 28, 1959, it being appreciated that the rigid panels, with their adjacent apices 38, and 40 adhesively secured to one another enhance the rigidity and render the core sufficiently strong to withstand the compacting of the uncompacted wrap, when placed in a frame. Such compacting may be greater over the central portion of the depth of the core, over the length of contact between the apices of the adjacent panels.

While a single form of the invention has been illustrated and described, it is to be understood that the invention is not limited thereto. As various changes in the construction and arrangement and procedure may be made without departing from the spirit of the invention, as will be apparent to those skilled in the art, reference will be had to the appended claims for a definition of the limits of the invention.

What is claimed is:

1. An air filter comprising a filter core construction composed of a plurality of like preformed rigid self sustaining panels of filter media arranged in a stack, with every other panel reversed, each panel comprising planar inlet and outlet marginal portions and a uniform series of V-sectioned corrugated portions extending from one marginal portion to the other, said V-corrugated portions having alternate apices lying in one of two spaced common planes, one of said planes being common to the inlet marginal portion, and the other being common to the outlet marginal portion, and said panels also having planar edge marginal portions lying in one of said planes.

2. An air filter in accordance with claim 1 wherein the inlet and outlet marginal portions of adjacent panels are bonded together along their entire contacting length, and wherein alternate apices of the corrugated portions of adjacent panels are in alignment and in contact and bonded together, and wherein the contacting adjacent planar edge portions of adjacent panels are also bonded together.

3. A filter in accordance with claim 1 wherein the core with its panels disposed vertically is disposed in an open rectangular frame having top and bottom and side members with the planar edge marginal portions sealingly engaged to the inside of the top and bottom members, and the marginal portion of the two end panels is adhesively secured to the respective frame side members.

4. A filter core in accordance with claim 1 wherein the V-sectioned corrugated portions transform gradually and merge into the outlet marginal portion to provide gradual decrease in flow rate on the outlet side of the filter to reduce turbulence.

5. A filter core in accordance with claim 1 wherein the V-sectioned corrugated portions transform gradually and merge into the inlet marginal portions to provide gradual increase in flow rate at the inlet side of the filter to reduce back pressure.

6. A filter core in accordance with claim 1 wherein the V-sectioned corrugated portions transform gradually and merge into the inlet marginal portion over a portion of their length to provide gradual increase in flow rate at the inlet side of the filter to reduce back pressure, and wherein the V-sectioned corrugated portions transform gradually and merge into the outlet marginal edges over a portion of their length greater than the length at the inlet side of the filter to reduce turbulence at the filter outlet side.

7. A filter core in accordance with claim 1 wherein each panel over its entire outlet surface is provided with a heat curable binder.

References Cited

UNITED STATES PATENTS

| | | | |
|---|---|---|---|
| 1,297,304 | 3/1919 | Ford | 156—595 |
| 2,350,996 | 6/1944 | Atkinson et al. | 156—595 |
| 2,494,431 | 1/1950 | Eckstein | 156—594 |
| 2,654,440 | 10/1953 | Robinson | 55—521 |
| 2,884,091 | 4/1959 | Baldwin | 55—500 |
| 2,980,208 | 4/1961 | Neumann | 55—500 |
| 3,025,964 | 3/1962 | Summers et al. | 210—493 |
| 3,112,184 | 11/1963 | Hollenbach | 210—493 |
| 3,258,900 | 7/1966 | Harms | 55—500 |
| 3,261,474 | 7/1966 | Parker et al. | 210—493 |

FOREIGN PATENTS 795,282  1/1936  France.

OTHER REFERENCES

German printed application Ser. No. 9,595, March 1956, Willy Neumann.

HARRY B. THORNTON, *Primary Examiner.*

B. NOZICK, *Assistant Examiner.*